Sept. 30, 1952 W. L. CHURCH 2,612,066
TONG
Filed March 26, 1948 3 Sheets-Sheet 3
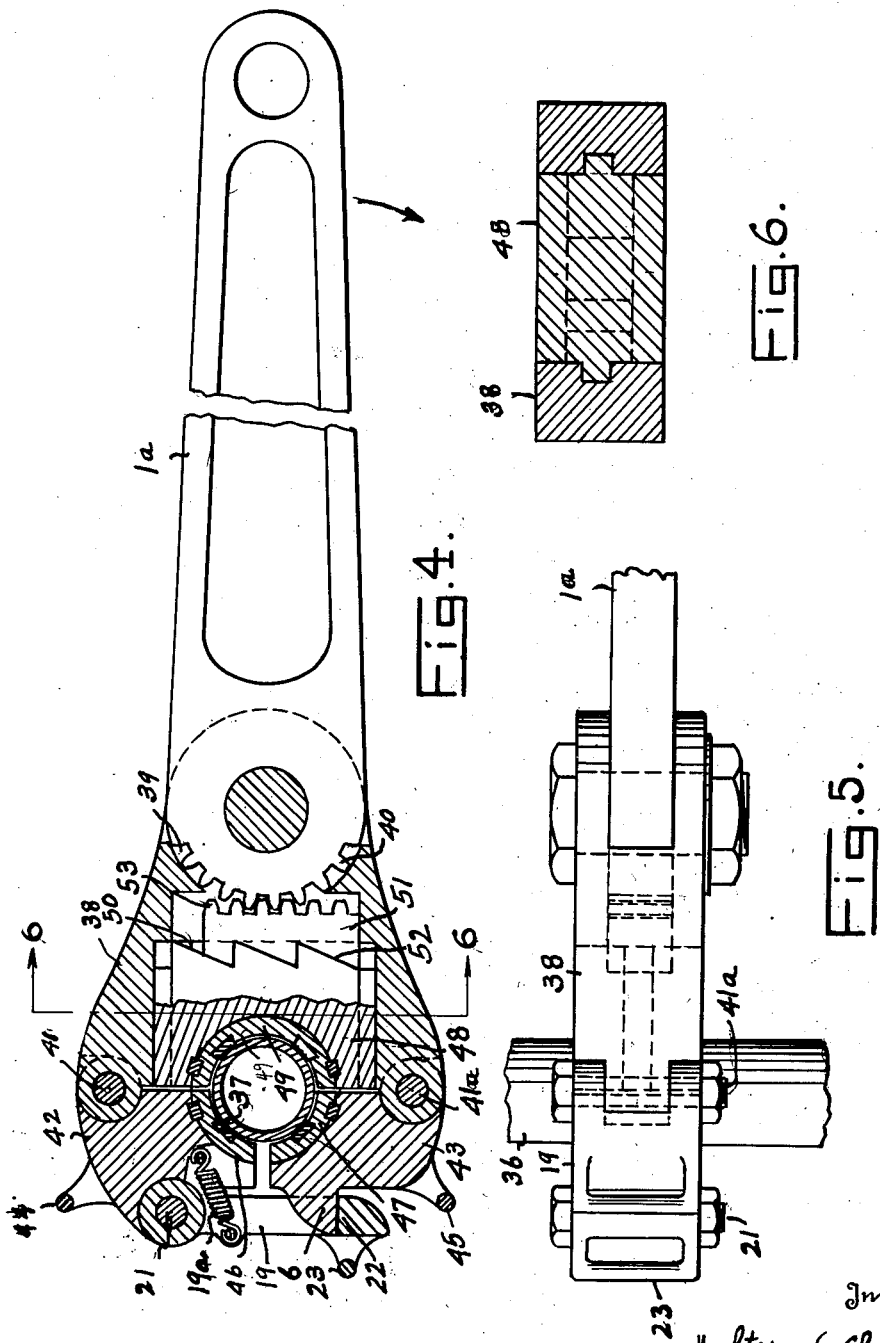
Inventor
Walter L. Church
By
E. V. Hardway,
ATTORNEY.

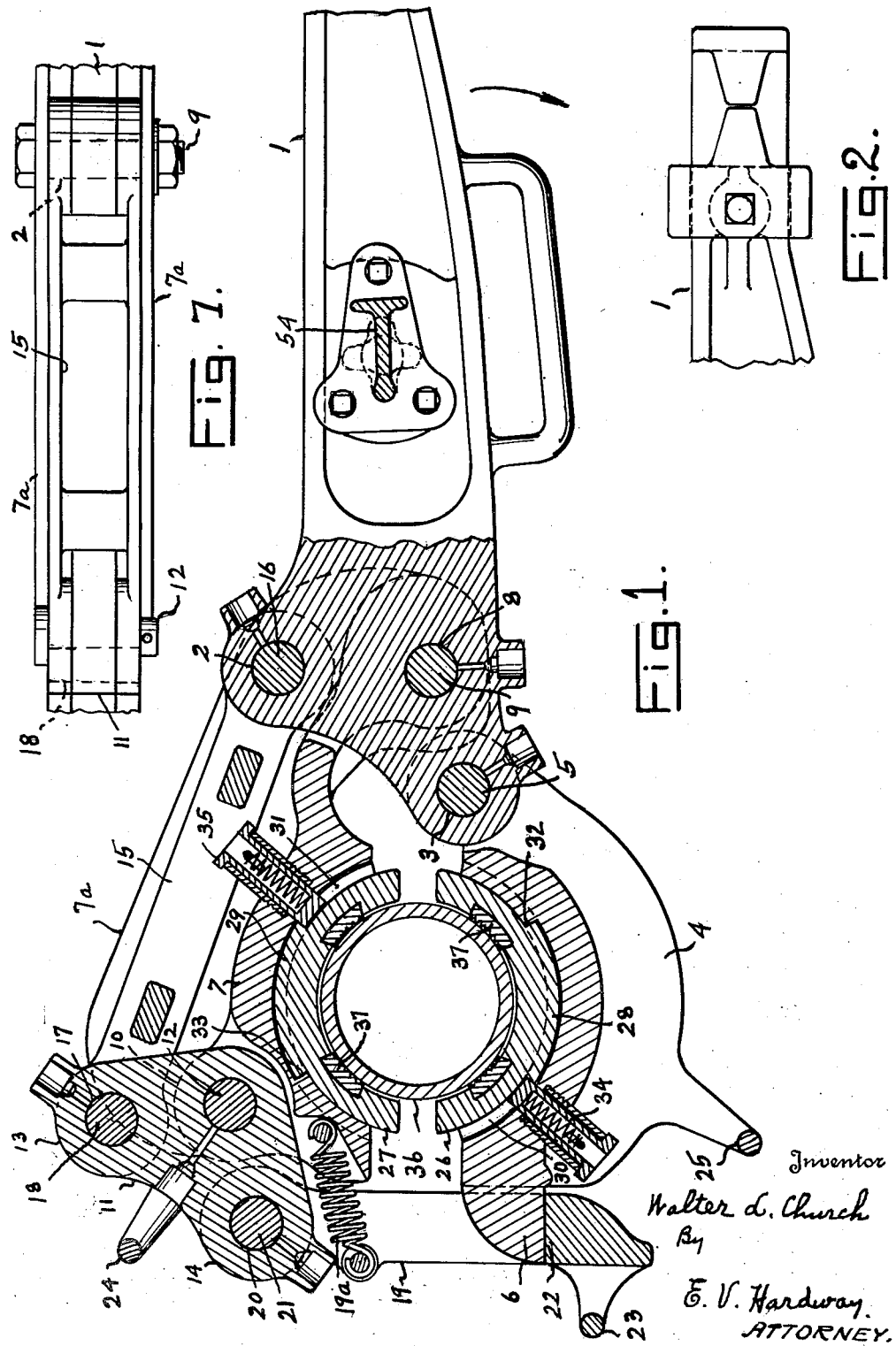

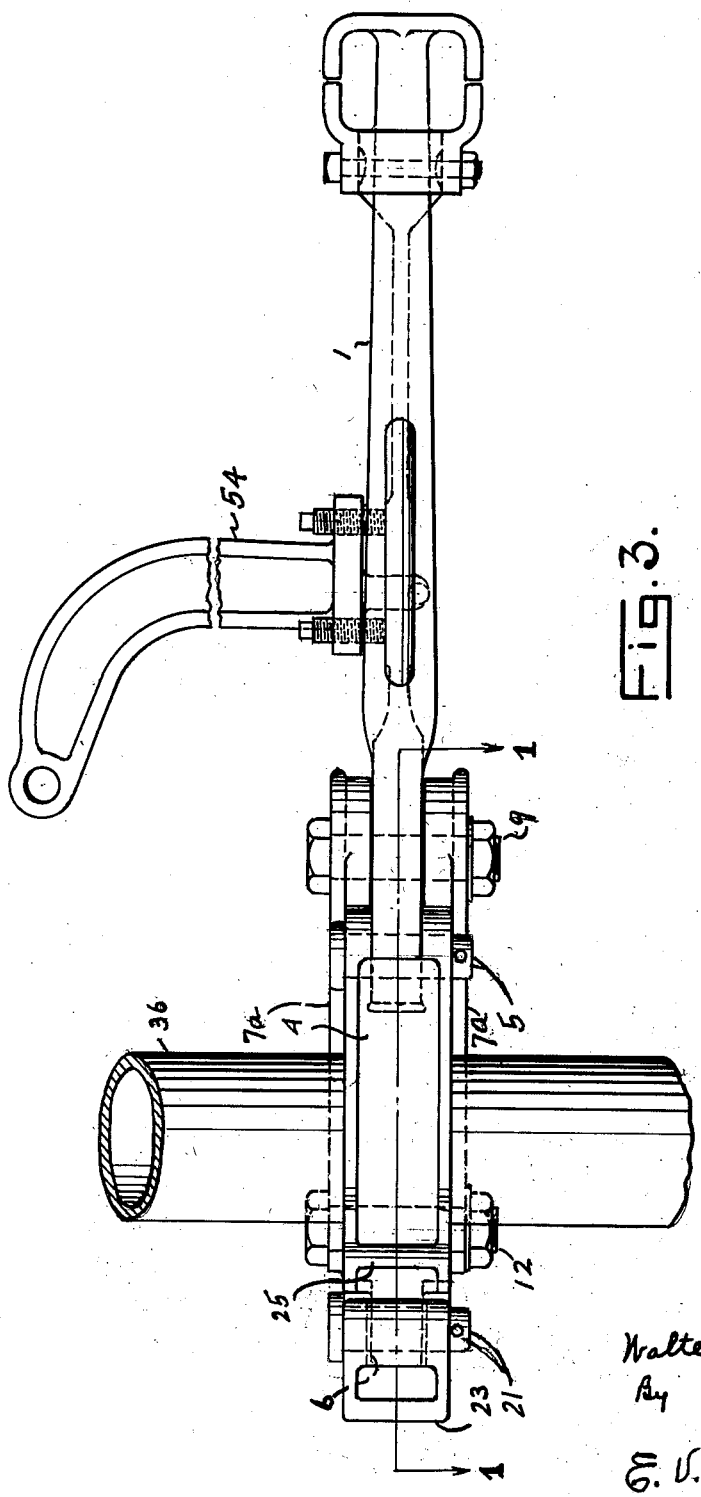

Patented Sept. 30, 1952

2,612,066

UNITED STATES PATENT OFFICE 2,612,066

TONG

Walter L. Church, Houston, Tex.

Application March 26, 1948, Serial No. 17,310

5 Claims. (Cl. 81—66)

1

This invention relates to a tong.

An object of the invention is to provide a tong of the character described specially designed for gripping round objects, such as pipe and whose jaws will be applied to the pipe with substantially equal pressure.

Tongs for the same general purpose as now constructed are of such arrangement that when applied to a pipe or other round object the jaws will be engaged with said object with unequal pressures thus either causing slippage of the tong or denting of the pipe because of the unequal pressure of the jaws thereto. It is a prime object of the present invention to provide a tong which is of such construction that when it is applied to a pipe or other round object the tong jaws which surround the gripped object will be applied with substantially equal pressures against the gripped object.

Other objects and advantages will be apparent from the following specification which is illustrated by the accompanying drawings, wherein:

Figure 1 is a plan view of the tong, partly in section, taken on the line 1—1 of Figure 3.

Figure 2 is a plan view of the outer end of the tong handle.

Figure 3 is a side elevation of the tong as applied to the work.

Figure 4 is a plan view, partly in section, of another embodiment of the invention.

Figure 5 is a fragmentary, side elevation thereof as applied to the work.

Figure 6 is a cross-sectional view taken on the line 6—6 of Figure 4, and

Figure 7 is a fragmentary, side elevation taken from the opposite side from that shown in Figure 3.

Referring now more particularly to the drawings, the numeral 1 designates a tong handle which, at its inner end, is widened, as indicated in Figure 1, and provided with the bearings 2 and 3 on opposite margins of said widened end and the latter of which is projected forwardly beyond the former.

There is an arcuate clamp 4, one end of which is bifurcated and embraces the adjacent inner end of the handle 1 and is formed with bearings which align with the bearing 3 and said aligned bearings receive the bolt 5 which is provided with a conventional head on one end and nut on the other end.

The free end of the clamp 4 has a radially turned lug 6 which is somewhat narrower than the vertical thickness of the clamp itself.

There is another arcuate clamp 7 which opposes and is complementary to the clamp 4.

2

One end of the clamp 7 is extended and bifurcated and embraces the inner end of the handle. The embraced end of the handle and the bifurcations of the clamp 7 have an aligned bearing 8 to receive the bolt 9 which is retained in place by means of a head on one end and a nut on the other.

The pivotal point of connection of the clamp 7 to the handle is spaced outwardly, relative to the handle, with respect to the pivotal point of connection of the clamp 4 with the handle.

Adjacent the free end of the clamp 7 it is provided with outwardly extended, spaced, lugs, as 10, and between these lugs there is a bell crank 11 which is pivoted on a retaining bolt 12 which passes through said lugs and the bell crank between them.

This bell crank has the forwardly diverging arms 13, 14.

The numeral 15 designates a connecting link one end of which embraces the inner end of the handle 1 and is provided with bearings which align with the bearing 2 to receive a pin 16 and the other end of the link 15 embraces the arm 13 of the bell crank and is provided with bearings which align with a bearing 17 of the bell crank and these aligned bearings receive a securing pin 18.

The clamp 7 is provided with the outwardly extended side guards 7a, 7a, as indicated in Figure 7, which extend the full length of said clamp 7 and which extend out beyond the link 15 and which form a shield or guard for said link and which, in operation of the tong, clear the pins 16, 18.

There is a securing latch 19 one end of which embraces the bell crank arm 14 and is provided with bearings which align with the bearing 20 of said arm 14 to receive a securing bolt 21 which passes through the corresponding ends of the latch and through the bearing 20.

The free end of the latch 19 is formed with a cross-bar 22 which is engageable over the lug 6, as shown in Figure 1.

The latch is held in releasable engagement with the lug 6 by means of a pull spring 19a, one end of which is connected to the latch and the other end of which is connected to the free end of the clamp 7.

The free end of the latch has a hand grip 23 for releasing or handling the latch and the bell crank 11 has a hand grip 24 for manipulating said bell crank; also the end of the clamp 4 is provided with a hand grip 25 by means of which said clamp 4 may be manipulated.

There are the arcuate jaws 26 and 27 which have external arcuate ribs 28 and 29 on their outer sides and which are considerably shorter than the jaws themselves.

In assemblying the jaws 26, 27 with their corresponding clamps the ribs 28, 29 may be inserted into the corresponding arcuate grooves 30 and 31 in the inner margins of the respective clamps 4 and 7. Upon insertion the ribs 28, 29 will abut opposing shoulders 32 and 33 in the clamps 4 and 7 and positioned to suitably limit the extent of the insertion of the jaws into said clamps and the clamps 4 and 7 are provided with radially working spring latches 34 and 35 which engage behind the rear ends of said ribs 28 and 29, as shown in Figure 1, to latch said jaws in place. These latches 34, 35 may be easily withdrawn to permit removal of the corresponding jaws.

The gripping jaws are provided with inside teeth to engage with the object to be turned, such as a pipe 36. Preferably these teeth are on independent inserts 37 carried by the inner sides of the jaws so that when the teeth become dull the inserts may be readily removed and replaced with new ones.

In operation the tong may be applied to the pipe in the usual way and the latch 19 engaged over the lug 6. The tong handle may then be actuated in the direction indicated by the arrow in Figure 1.

This will cause the pivoted ends of the clamps 4, 7 to be drawn toward each other and will at the same time exert a pull on the link 15 and on the corresponding arm 13 of the bell crank 11 and the other end of said bell crank will exert a pull, through the latch 19, on the free end of the clamp 4. Said bell crank being fulcrumed on the free end of the clamp 7, the free ends of the clamps will be also forced toward each other. The parts are so proportioned that the hinged ends of the clamps and the latched ends will be moved toward each other equal distances when the handle 1 is actuated in the direction above indicated so that the jaws will be applied to the pipe with equal force all the way around.

Referring to the embodiment illustrated in Figure 4 the numeral 38 designates the head of the tong to one end of which the handle 1a is pivoted. The pivoted end of the handle is inserted into a slot 39 in said head and is formed with an arcuate rack face 40.

Pivoted to the opposite end of the head, on bolts 41, 41a are the clamps 42, 43 provided with the hand grips 44, 45 by means of which they may be swung into open and closed position.

Pivoted to the free end of the clamp 42 there is a U-shaped latch 19 whose free end is formed with a cross-bar 22 engageable over the lug 6 of the clamp 43 and releasably maintained in such engagement by a pull spring 19a which is connected at one end to said latch and at its other end to the clamp 42.

The latch is provided with a hand grip 23 for releasing or handling said latch.

Within and secured to the clamps 42, 43 are the arcuate jaws 46, 47 provided to engage and grip the pipe 36 to be turned.

Within the forward end of the head 38 there is slidably mounted a clamp 48 whose end, facing the jaws 46, 47, is arcuate and mounted therein there is an arcuate jaw 49 which is complementary to the jaws 46, 47.

The opposite margin of the clamp 48 is provided with a series of tapering contact faces 50 which taper in the same direction and slidable within the head there is a transverse bar 51 having tapering faces 52 which contact with the opposing faces 50. The opposite margin of the bar 51 is provided with rack teeth 53 which are in mesh with the teeth 40 of the handle 1a. The inner sides of the gripping jaws 46, 47 and 49 are provided with teeth which may, if desired, be formed on independent inserts 37 on the inner sides of said jaws in the same manner as shown in Figure 1. When the tong of the type shown in Figure 4 is applied to and latched about the pipe and the handle 1a actuated in the direction indicated by the arrow in Figure 4 the intermeshing teeth 40 and 53 will force the bar 51 in the opposite direction causing its tapering faces to ride upon the tapering faces of the clamp 48 thus forcing said clamp toward the pipe and, as is obvious, a similar pull will be exerted on the clamps 42, 43 so that the jaws 46, 47 will be pulled against the pipe with a force equal to that exerted against the jaw 49.

The toothed inserts in the jaws of both forms should be spaced apart equidistances about the pipe and upon application of the tong, of either form, to the pipe the jaws will be clamped about the pipe with equal force thus giving a better gripping hold on the pipe and reducing the liability of denting the pipe.

The tong handle may be equipped with a hanger 54 by means of which the tong may be suspended for application to the work.

The drawings and description are illustrative merely while the broad principle of the invention will be defined by the appended claims.

What I claim is:

1. A tong comprising opposed clamping members shaped to surround an object to be turned, first and second cranks pivotally mounted between their ends adjacent the opposite ends of one of said members, the other of said members being pivotally connected to one end of said first crank, latch means pivotally connected to one end of said second crank and cooperable with the other end of said other of said members to latch the members in position about said object, link means pivotally connecting the other ends of said cranks, and means for rotating said first crank.

2. A tong comprising a handle, a first clamping member pivoted at its inner end to the handle, a second clamping member disposed in opposing relation to the first member and pivoted at its inner end to the handle at a point outwardly of the inner end of the first member, said members being shaped to surround an object to be turned, a bell crank pivotally mounted adjacent the outer end of the first member, link means pivotally connected to one arm of the bell crank and to said handle, and latch means pivotally connected to the other arm of the bell crank and engageable with the outer end of the second member to latch the members about said object.

3. A tong comprising a handle, a first clamping member pivoted at its inner end to the handle, a second clamping member disposed in opposing relation to the first member and pivoted at its inner end to the handle at a point outwardly of the inner end of the first member, said members being shaped to surround an object to be turned, a bell crank pivotally mounted adjacent the outer end of the first member, a link pivotally connected at one end to one arm of the bell crank and at the other end to the handle at a point laterally spaced from the inner ends of the members, and latch means releasably connecting the other arm of the bell crank and the outer end of the second member to latch the members about said object.

4. A tong comprising a handle, a first clamping member pivoted at its inner end to the handle, a second clamping member pivoted at its inner end to the handle at a point outwardly of the inner end of the first member, a bell crank pivotally mounted adjacent the outer end of the first member, a link pivotally connected at one end to one arm of the bell crank and at the other end to the handle at a point laterally spaced from the inner ends of the members, latch means pivotally connected to the other arm of the bell crank and releasably engageable with the outer end of the second member and gripping means disposed between the members and adapted to surround and grip an object to be turned.

5. A tong comprising a handle, opposed clamping members pivoted at their inner ends to the handle at spaced points thereon, said members being shaped to surround an object to be turned, a bell crank pivotally mounted adjacent the outer end of one of said members, link means pivotally connected to one arm of the bell crank and having a pivotal connection with the handle at a point spaced from the inner ends of the members, and latch means pivotally connected to the other arm of the bell crank and engageable with the outer end of the other of said members to latch the members about said object.

WALTER L. CHURCH.

REFERENCES CITED

The following references are of record in the file of this patent:

UNITED STATES PATENTS

| Number | Name | Date |
|---|---|---|
| 1,447,327 | Roye | Mar. 6, 1923 |
| 1,588,619 | Roye et al. | June 15, 1926 |
| 1,611,808 | Bessolo | Dec. 21, 1926 |
| 1,635,031 | Champion | July 5, 1927 |
| 1,869,631 | Swanson | Aug. 2, 1932 |
| 1,900,378 | Baash et al. | Mar. 7, 1933 |
| 1,919,468 | Jones | July 25, 1933 |
| 2,223,132 | Roberts | Nov. 26, 1940 |
| 2,278,439 | Grau et al. | April 7, 1942 |
| 2,406,520 | Wilson | Aug. 27, 1946 |
| 2,423,326 | Jones | July 1, 1947 |
| 2,466,032 | Lundeen | Apr. 5, 1949 |